Figure 1:
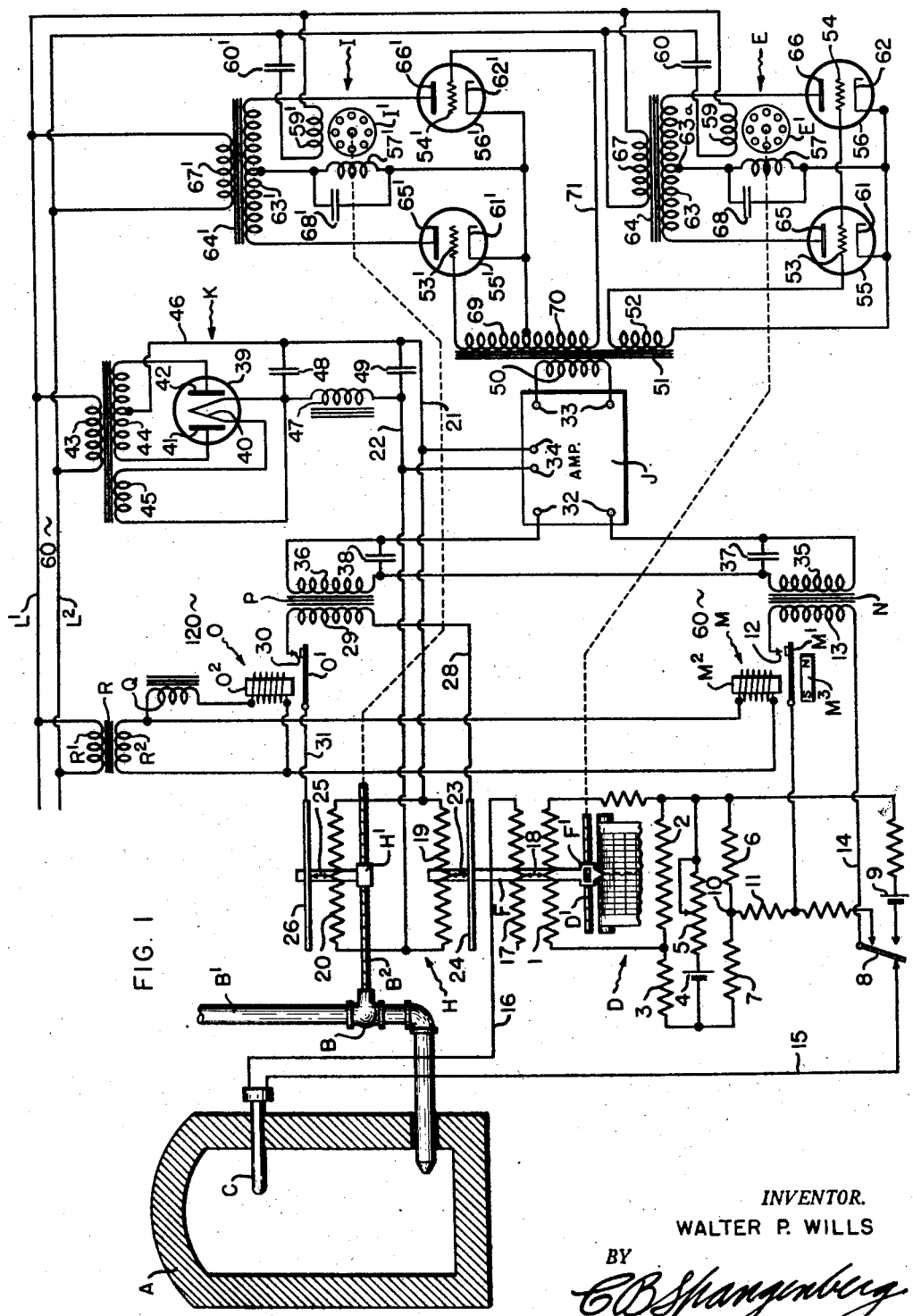

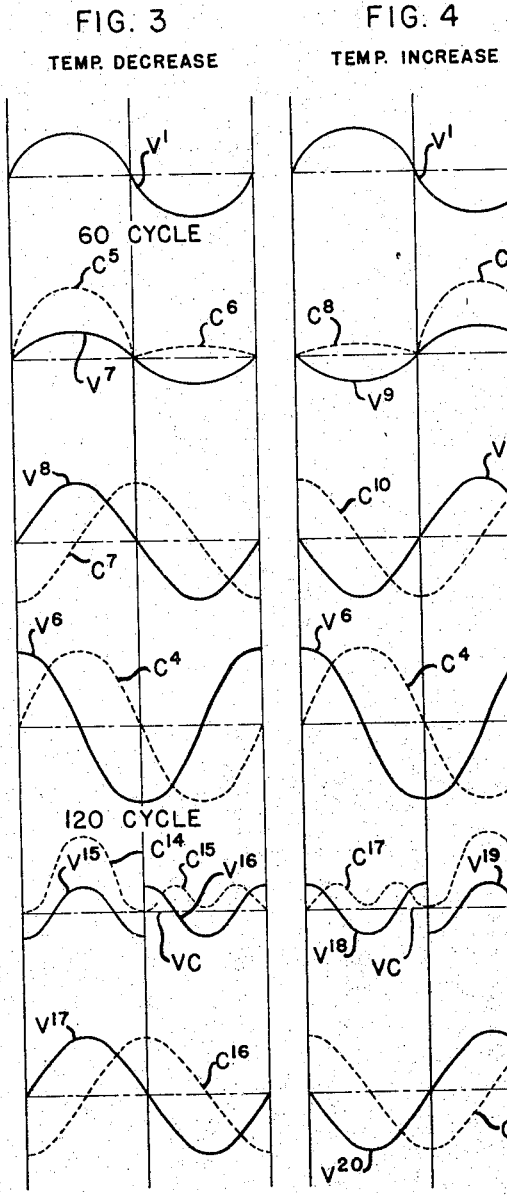

Patented May 22, 1945

2,376,527

UNITED STATES PATENT OFFICE 2,376,527

MEASURING AND CONTROLLING APPARATUS

Walter P. Wills, Philadelphia, Pa., assignor to The Brown Instrument Company, Philadelphia, Pa., a corporation of Pennsylvania Application February 6, 1943, Serial No. 474,965

9 Claims. (Cl. 172—239)

The general object of the present invention is to provide improved measuring and control apparatus of a type comprising a plurality of relay mechanisms separately controlled, each in response to variations in a thermocouple voltage or other relatively minute electrical quantity constituting a measure of a control condition different from the condition, which by its variations, controls any other of said relay mechanisms.

A more specific object of the invention is to provide apparatus of the general type specified with reversible, alternating current relay motors controlled through a common electronic amplifier having an input circuit on which a variation in each of said control conditions impresses an alternating voltage selectively dependent on the magnitude and direction of said variation and of a frequency which is predetermined and different from the frequency of the voltage which a variation in any other of said conditions impresses on said input circuit, and in which each relay motor includes a control winding which is connected to the output circuit of said amplifier and is selectively actuated by a component of the amplifier output current of a frequency different from that of the component actuating each other motor.

In a simple preferred form of the present invention, two alternating current motors having control windings connected to the output circuit of a common amplifier, and having power windings energized by a commercial alternating current supply system of conventional frequency, are combined with means through which the variations in the the two controlling conditions impress on the input circuit of a common amplifier an alternating voltage selectively dependent on the variations in one condition and of the same frequency as the supply system, and a second alternating voltage of a frequency double the supply system frequency and selectively dependent on the variations in the second of the controlling conditions, and the control winding of one of said motors is of a character to be selectively responsive to current of the power system frequency and the control winding of the other motor is of a character to be selectively responsive to current of a frequency which is double that of the power system.

A further specific object of the present invention is to provide a relay motor control circuit arrangement including electronic valve means for utilizing plate current voltage of the supply system frequency and grid bias voltage of a frequency double that of the supply system to create a current flow of double the supply system frequency through the control winding of the motor.

Relay motors arranged and controlled in accordance with the present invention are well adapted for use for a variety of purposes, including, for example, their use in rebalancing self-balancing potentiometers, in adjusting the recording elements of measuring instruments, in the regulation of a furnace fuel supply in response to variations in a furnace temperature, and for analogous regulation purposes.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a diagram illustrating apparatus for measuring a furnace temperature and controlling the fuel supply to the furnace in accordance with the temperature measured; and Figs. 2, 3 and 4 are curves showing voltages and current values and conditions in different parts of the measuring and control apparatus shown in Fig. 1, under various operating conditions.

In Fig. 1 I have diagrammatically illustrated, by way of example, an embodiment of my invention in which the supply of fuel to a furnace A is regulated by the adjustment of a fuel valve B in a fuel supply pipe B', in response to variations in a furnace temperature to which a thermocouple C is exposed. The means diagrammatically shown for measuring the thermocouple temperature comprises a self-balancing potentiometric instrument D including a reversible rebalancing motor E set into operation in one direction or the other on and in accordance with variations in one direction or the other of the temperature to which the thermocouple C is exposed.

The rotor E' of the motor E is operatively connected to a threaded shaft D' which is in threaded engagement with a member F. The latter, as diagrammatically shown, carries a recording element F' of the instrument D, and also carries two slide wire engaging contacts 18 and 23. As hereinafter explained, the motor E through its adjustment of said contact 18, rebalances the potentiometer instrument; and through its adjustment of the contact 23, the motor E unbalances the bridge circuit of control apparatus H of the electric proportioning type.

The apparatus H includes a control bridge circuit and a reversible motor I which, when the last mentioned bridge circuit is unbalanced, is set into operation to rebalance said circuit and to effect a proportional adjustment of the fuel valve B. As shown, the spindle B² of the valve B, which is in threaded engagement with the body of the valve H, has an elongated external threaded portion in threaded engagement with a nut portion of an adjusting element H' which carries a slide wire engaging contact 25. The rotor I' of the motor I is connected to the valve spindle B² and rotates the latter when operated, and thereby gives a corrective adjustment to the valve B, and a proportional adjustment to the contact carried by the member H'. The two motors E and I are directly controlled through an electronic amplifier J which is supplied with energizing current by a power unit K, including electronic rectifying means energized through the supply conductors L' and L² of an alternating current supply system of conventional frequency, which may well be, and is hereinafter assumed to be a 60 cycle frequency.

A vibrator M comprising an armature M' and an electro-magnet M², cooperates with a transformer N and with the potentiometer D as hereinafter described, to impress on the input circuit of the amplifier J an alternating voltage which has the supply system frequency and which is selectively dependent in magnitude and in its phase relation to the supply system voltage, on the magnitude and direction of each variation in temperature of the thermocouple C. As shown, the terminals of the winding of the electro-magnet M² are connected to the terminals of the secondary winding R² of a transformer R which has its primary winding R' connected across the supply conductors L' and L². The armature M' is polarized by means diagrammatically shown as comprising a permanent magnet M³ alongside the armature M'. In consequence, the latter is attracted and released by the electro-magnet M² once only during each cycle of alternation of the fluctuating supply system voltage.

A second vibrator O comprising an unpolarized armature O' and an electro-magnet O² cooperates with the transformer P, a phase shifting inductance Q, and the electric proportioning control system H, to impress on the input circuit of the amplifier J an alternating voltage having a frequency double that of the supply system and dependent in intensity and in its phase relation to the supply system voltage on the extent and direction of each departure from balance of the proportioning control system bridge circuit. The winding of the electro-magnet O² and the phase shifting inductance Q are connected in series between the terminals of the transformer secondary winding R². As the armature O' is not polarized, it is attracted and released by the magnet O² twice during each alternation cycle of the fluctuating supply system voltage.

The potentiometer circuit network of the instrument D comprises a slide wire resistance 1 included in a split potentiometer bridge circuit of conventional form. As shown, said circuit comprises three main branches, one of which includes resistances 2 and 3 connected in series and the slide wire resistance 1 which is connected in shunt to the resistance 2. A second branch of the potentiometer circuit includes a battery 4 and a resistance 5 which may be adjusted from time to time as required to maintain the bridge energizing current, supplied by the battery 4, at a proper value. The third main branch of the potentiometer circuit includes resistances 6 and 7. A calibrating switch 8 is provided for operatively connecting a standard cell 9 into the potentiometer circuit from time to time to determine what adjustment of the resistance 5 may then be needed, but as the calibrating operation is well known and forms no part of my invention, it need not be further described.

In the normal position of the switch 8 shown in Fig. 1, it connects the thermocouple C into a branch of the potentiometer network extending between a point in the slide wire resistance 1 engaged by a sliding contact 18 carried by the member F and an intermediate point 10 in the circuit branch including the resistances 6 and 7. The circuit connection between said points includes a resistance 11, the armature M' of the vibrator M, a contact 12 engaged by said armature when the latter is attracted by the vibrator electro-magnet M², the primary winding 13 of the transformer N which has one terminal connected to the contact 12, a conductor 14 through which the other terminal of winding 13 is connected to the switch 8, a conductor 15 through which the switch 8 is connected to one terminal of the thermocouple C, a conductor 16, a resistance 17 alongside the slide wire 1 and the bridging contact member 18, which connects the slide wire resistances 17 and 1. As previously explained, the polarized armature M' of the vibrator M is attracted and released by the electro-magnet M² during each alternation cycle of the 60 cycle current energizing said electro-magnet. The contact 18 which is carried by the potentiometer instrument element F, is adjusted along the lengths of the resistances 1 and 17 when the threaded shaft F' is rotated by the motor E to rebalance the potentiometer measuring circuit after the latter has been unbalanced as a result of a variation in the temperature of the thermocouple C.

Except for the inclusion of the vibrator armature M', the contact 12 and the transformer 13 in the potentiometer circuit network, that network is of a conventional type which is disclosed in the Harrison Patent 1,898,124 of February 21, 1933, and has long been in general use, and hence need not be further described herein.

As those skilled in the art will understand, in the normal balanced condition of the apparatus shown in Fig. 1, the voltage of the thermocouple C will be equal and opposite to the voltage difference between the point in the slide wire resistance 1 which is engaged by the bridging contact 18, and the potentiometer circuit point 10, so that no current will then flow through the primary winding 13 of the transformer N. On a change in the temperature of the thermocouple, the latter cooperates with the vibrator armature M' and contact 12 to create a pulsating current flow through the transformer primary winding 13 in one direction or the other, depending upon whether the temperature change is an increase or decrease. In consequence, the pulsating current flow through the transformer winding 13 creates an alternating current flow in the input circuit of the amplifier J with a phase relation to the voltage between the supply conductors L' and L², which is selectively dependent upon whether the thermocouple change giving rise to the current flow is an increase or a decrease.

The bridge circuit of the electronic proportioning system H, comprises slide wire resistances 19 and 20, connected in parallel to one another by the conductors 21 and 22, between which a suitable predetermined D. C. voltage difference is maintained by a rectifier K. The latter may be, and as shown is, of conventional type and form. The slide wire resistances 19 and 20 constitute what are sometimes referred to as the measuring and control resistors, respectively, of an electric proportioning system bridge. In the arrangement shown in Fig. 1, the measuring resistor 19 is engaged by bridging contact 23 which also engages a stationary conductor 24 alongside the resistor 19. The contact 23 is carried by the potentiometer member F and is adjusted longitudinally of the resistor 19 and conductor 24, on and in accordance with the potentiometer rebalancing operation of the motor E. The resistor 20 is engaged by bridging contact 25 which also engages a stationary conductor 26 alongside the resistor 20.

The contact 25 is carried by the previously mentioned member H' which includes a nut portion in threaded engagement with the threaded external portion of the valve spindle B², so that when said spindle is rotated by the motor I, the member H' and contact 25 are adjusted longitudinally along the bridge resistor 20 and conductor 26. The conductor 24 is connected by a conductor 28 to one terminal of the primary winding 29 of a transformer P. The other terminal of that winding is connected to a contact 30 which is engaged by the armature O' of the vibrator O when the electro-magnet O² of that vibrator is energized. The armature O' is connected by a conductor 31 to the conductor 26. As the vibrator armature O' is unpolarized it is attracted and moved into, and is then allowed to move out of engagement with the contact 30, twice during each cycle of alternation of the current energizing the electro-magnet O² of the vibrator O.

In the normal balanced condition of the apparatus shown in Fig. 1, the bridging contacts 23 and 25 engage the resistors 19 and 20, respectively, at points which are at the same potential, so that the bridge then impresses no voltage on the primary winding 29 of the transformer P. On a change in the temperature of the thermocouple C and the resultant rebalancing operation of the potentiometer motor E, the movement of the member F adjusts the bridging contact 23 along the resistor 19 and thus unbalances the control bridge circuit including said resistor, by increasing or decreasing the potential of the contact 23 relative to the potential of the contact 25. In consequence of such potential difference a pulsating current flow through the primary winding 29 of the transformer P is then created in one direction or the other, depending upon the direction of adjustment of the contacts 23 along the resistor 19.

The pulsating current flow through the primary of the transformer P creates an alternating current flow in the input circuit of the amplifier J which is of a frequency double that of the voltage between the supply conductors L' and L², and which is dependent in magnitude and in its phase relation to the last mentioned voltage, on the extent and direction of the preceding adjustment of the contact 23 giving rise to the rebalancing operation of the motor I, all as is hereinafter more fully explained. The rebalancing operation of the motor I moves the bridging contact 25 along the resistor 20 to the extent and in the direction required to again make the voltage of the contacts 23 and 25 equal, and in doing so, effects a proportional adjustment of the fuel valve B.

The amplifier J may be of any conventional electronic type used for control purposes analogous to those provided for herein, and, as shown, it comprises input terminals 32, output terminals 33 and energizing terminals 34. The latter are connected one to the positive terminal 22 and the other to the negative terminal 21 of the power unit K. The input circuit of the amplifier includes the secondary windings 35 and 36 of the transformers N and P, respectively, which are connected in series with one another between the input terminals 32. A condenser 37 is connected in parallel with the transformer secondary winding 35, and a condenser 38 is connected in parallel to the transformer secondary winding 36. Said condensers provide parallel resonant circuit effects which reduce the impedance to the flow of the currents induced in said secondary windings.

The rectifier K which supplies direct current for energizing the amplifier J and also the bridge circuit of the control apparatus H, is shown as of conventional full wave type, comprising an electronic tube 39 including a filament type cathode 40 and two anode plates 41 and 42, and a transformer which has its primary winding 43 connected between the supply conductors L' and L². One secondary winding 44 of said transformer has one end terminal connected to the plate 41 and has its other end terminal connected to the plate 42 of tube 39. Another secondary winding 45 of said transformer supplies current to the filament type cathode 40. The mid point of the transformer secondary 44 is connected by a conductor 46 to the conductor 21. The cathode 40 is connected to the conductor 22 through an inductance 47. The inductance 47 and condensers 48 and 49 provide conventional filter effects to smooth out the current flow in the rectifier output conductors 21 and 22.

As shown, the amplifier output terminals 33 are connected to the terminals of the primary coil 50 of a transformer 51 through which the amplifier is operatively connected to the energizing circuits of the motors E and I. A secondary winding 52 of the transformer 51 has one terminal connected to the grid elements 53 and 54, and has its other terminal connected to the cathodes 61 and 62, which control the energization of the control winding 57 of the potentiometer rebalancing motor E. The latter, as diagrammatically illustrated, is a multi-phase alternating current motor having a squirrel cage type rotor E' adapted to rotate in one direction or the other, depending on the phase relation of the currents flowing in the stator control winding 57 and in the stator power winding 59. Those currents cooperate, when the potentiometer bridge circuit is unbalanced, to maintain an electro-magnetic field rotating in one direction on an increase, and in the opposite direction on a decrease in the temperature of the thermocouple C.

The stator power winding 59 of the motor E is shown as connected across the supply conductors L' and L² in series with a condenser 60, which combines with the winding 59 to form a circuit which is substantially series resonant when the motor is operating at full load. The winding 57 has one terminal connected to the cathodes 61 and 62 of the triodes 55 and 56, respectively, and has its other terminal connected to the mid point 63a of a secondary winding 63 of a transformer 64. The cathodes 61 and 62 may be heated by the usual heating filaments, omitted from Fig. 1 to simplify the latter. One end terminal of the secondary winding 63 is connected to the anode 65 of the triode 55, and the other end terminal of the winding 63 is connected to the anode 66 of the triode 56. The portions of the transformer winding 63 at opposite sides of its mid point 63a, may be regarded as each forming a separate transformer secondary. The primary winding 67 of the transformer 64 is connected across the supply conductors L' and L². A condenser 68 is connected in parallel to the motor control winding 57 to form a circuit which is substantially parallel resonant when the motor is operating under full load.

The character of the potentiometer rebalancing operations of the motor E are illustrated by the current and voltage curves shown in Figs. 2, 3 and 4. The uppermost curve V' in each of said figures, represents the alternating voltage supplied by the said conductors L' and L², which does not change significantly as a result of changes in operating conditions of the apparatus. The three sets of curves in Figs. 2, 3 and 4 directly below the voltage curve V' and under the legend "60 cycle," illustrate current and voltage conditions in different portions of the energizing circuits of the motor E under different operating conditions. The two lowermost sets of curves in Figs. 2, 3 and 4, under the legend "120 cycle," illustrate current and voltage conditions in the energizing circuits of the hereinafter described motor I.

The 60 cycle curves of Fig. 2 represent curves and voltages prevailing when the potentiometer is balanced and the motor E is idle. The 60 cycle curves of Fig. 3 illustrate currents and voltages in the circuits of the motor E when the potentiometer is unbalanced and the motor E is in operation as a result of a decrease in the temperature of the thermocouple C, and the 60 cycle curves of Fig. 4 illustrate currents and voltages in said circuits when the potentiometer is unbalanced, and the motor is in operation as a result of an increase in the temperature of the thermocouple C.

When the potentiometer is balanced, no current is impressed on the amplifier J by the transformer N, and the amplifier J and transformer 51 then impress no 60 cycle potential variations on the grid elements 53 and 54 of the triodes 55 and 56, and the then existing zero biases of the two grids are respectively represented by the straight lines V² and V³ of Fig. 2. With no bias potential impressed on the grid 53, plate current will flow through the tube 55 during the half cycles in which the terminal of the transformer secondary 63 which is connected to the anode 65 is positive relative to the winding 63 mid point. That current is represented in Fig. 2 by the curve C'. During the second half of the alternation cycle, no plate current will flow through the tube 55, but plate current will then flow through the tube 56, since the end terminal of the transformer winding 63 connected to the anode 66 is then positive relative to the mid point of the winding 63. The last mentioned current flow is illustrated by the curve C² of Fig. 2.

The triode current pulses C' and C² coact to produce voltage pulses in the motor control winding 57 during the first and second halves of the alternation cycle, said voltage pulses being represented in Fig. 2 by the curves V⁴ and V⁵, respectively. The said voltage pulses in the winding 57 result in an alternating current flow through that winding, which has a fundamental frequency of 120 cycles, and is represented by the curve C³ of Fig. 2. Due to the inductance of the winding 57, the C³ current flow lags 90 degrees behind the 120 cycle voltage pulses producing said current flow.

As will be apparent, the 120 cycle current represented by the curve C³, will not coact with the 60 cycle current flow in the power winding 59 of the motor E to produce a revolving magnetic field operative to rotate the rotor E' of the motor E. The voltage in the power winding 59 of the motor E is represented in Fig. 2 by the curve V⁶, which is similar in form to the alternating supply voltage curve V', but leads the latter by 90 degrees, and similarly leads the alternating current which flows through the power winding 59 and which is represented by the curve C⁴ of Fig. 4. The form, frequency and phase relation of the alternating current flow and the alternating voltage in the power winding 59 are not significantly affected by a change in the temperature of the thermocouple C, and the curves V⁶ and C⁴ of Fig. 2 are repeated in Figs. 3 and 4.

For the purposes of the present invention, the amplifier and associated circuits are so arranged that on potentiometer unbalancing change in the temperature of the thermocouple C, the grids or control electrodes 53 and 54 of the triodes 55 and 56 will have impressed on them a signal or bias potential which will be substantially in phase, or substantially 180 degrees out of phase with the supply system voltage represented by the curve V', depending on the direction of thermocouple temperature change. It will be assumed hereinafter that when the potentiometer is unbalanced as a result of a decrease in the temperature of the thermocouple C, the signal potential impressed on the control electrodes 53 and 54 will be in phase with the supply system voltage represented by the curve V'.

In accordance with the foregoing assumptions, on a decrease in the thermocouple temperature, the alternating potential impressed on the grids 53 and 54 may be represented by the curve V⁷ of Fig. 3. The impression of said potential on the grids 53 and 54 increases the plate current flow through the tube 55 during the first half of the supply system voltage cycle in which the anode 65 of tube 55 is assumed to be positive, and diminishes the plate current through the tube 56 during the second half cycle in which the anode 66 is assumed to be positive, the said plate currents being represented by the curves C⁵ and C⁶ of Fig. 3. The plate currents C⁵ and C⁶ produce an alternating voltage across the control winding 57, which is illustrated by the curve V⁸ of Fig. 3, and produce a current through the control winding 57 which includes an alternating current illustrated by the curve C⁷ of Fig. 3. The 60 cycle current shown by the curve C⁷, lags 90 degrees behind the 60 cycle current flowing in the power winding 59 of the motor E which is represented by the curve C⁴, and the current produces a rotating magnetic field which causes the rotor E' of the motor E to rotate in the direction, assumed to be clockwise, required to adjust the member F to the left and thereby rebalance the potentiometer.

Upon a significant increase in the thermocouple temperature, the operation is generally like that above described, except that it results in a rotation of the motor rotor E' in a counter-clockwise direction. On a significant increase in the furnace temperature, the signal or bias voltage impressed on the grids 53 and 54 is illustrated by the curve $V^9$ of Fig. 4, which is similar in form to, but 180 degrees out of phase with curve $V^7$ of Fig. 3. The potential of grid 53 is then driven so far negative that little or no current will flow through the plate circuit of tube 55 during the first half of each supply voltage cycle, but during the second half of each such cycle the plate current through tube 56 will be greater than it is in Fig. 2, because the grid 54 is more positive in its Fig. 4 condition. In the Fig. 4 condition, the plate currents of the tubes 55 and 56 during the first half cycle and second halves of the supply voltage cycle, are represented by the curves $C^8$ and $C^9$, respectively, of Fig. 4.

The plate currents represented by the curves $C^8$ and $C^9$, impress a voltage on the motor winding 57 which is represented by the curve $V^{10}$ of Fig. 4, and results in an alternating current flow through the winding 57 which is represented by the curve $C^{10}$ of Fig. 4. The curves $V^{10}$ and $C^{10}$ are similar in form to the curves $V^8$ and $C^7$, respectively, of Fig. 3, but are 180° out of phase with the last mentioned curves. In Fig. 4 the current through winding 57 represented by the curve $C^{10}$ lags 90 degrees behind the voltage represented by the curve $V^{10}$, but leads the current $C^4$ in the power winding 59 by 90 degrees, and this, on the assumptions hereinbefore made, produces a rotating magnetic field which rotates the rotor E' in the counter-clockwise direction, and adjusts the member F to the right.

The motor E is preferably so constructed that the control winding 57 has a high impedance to match the plate impedance of the triode tubes 55 and 56, and the power winding 59 preferably has a high impedance in order to provide for efficient operation. Preferably, the control and power windings 57 and 59 of the motor E have a high ratio of inductive reactance to resistance, for example, from 6 to 1 to 8 to 1 at 60 cycles, so as to provide maximum power and minimum heating when the motor is in operation, and to provide a low impedance path in the control windings for anti-hunting purposes. Furthermore, the high ratio of inductive reactance to resistance in the power winding of the motor insures that the motor heats less when stalled than when running. Moreover, the D. C. component of the currents flowing in the motor control winding 57 under different operating conditions, contribute to advantageous motor braking and other beneficial effects, but those matters need not be further discussed or explained herein, as the construction of a motor which is like the motor E, and means for controlling the operation of said motor by means of an amplifier impressing selectively phased control bias signals on the grids of motor drive triodes like the triodes 55 and 56, are now in commercial use and are fully disclosed and claimed in my prior application, Serial No. 421,173, filed December 1, 1941.

The motor I may, and as shown does, comprise parts 53' to 68' identical in structure and arrangement with the parts 53 to 68, respectively of the motor E. Furthermore, a secondary winding 69 of the transformer 51 is connected to the grid 53' and cathode 61' of the triode 55', exactly as the transformer secondary 52 of said transformer is connected to the grid 53 and cathode 61 of the triode 55. However, the grid 54' of the triode 56' is not maintained at the same potential as the grid 53'. On the contrary, another secondary winding 70 of the transformer 51 impresses a bias potential or signal on the grid 54' of the triode 56, which is 180 degrees out of phase with the signal impressed on the grid 53' by the transformer secondary 69. As shown in Fig. 1, the transformer secondary 70 has its upper end connected to the lower end of the secondary 69 and thereby to the cathode 62' as well as to the cathode 61', and has its lower end connected to the grid 54'.

In the balanced condition of the apparatus shown in Fig. 1, no signal is impressed on the input circuit of the amplifier J, and no bias potential or signal is impressed on the grids 53' and 54' of tubes 55' and 56', respectively, and the 120 cycle grid voltage and plate current curves $V^{11}$, $V^{12}$, $C^{11}$ and $C^{12}$ of Fig. 2, are thus exactly like the previously mentioned 60 cycle curves $V^2$, $V^3$, $C'$ and $C^2$, respectively. Further, with no bias potential impressed on the grids 53' and 54' the voltage and current in the motor winding 57' will be represented by the curves $V^{13}$, $V^{14}$, and $C^{13}$ of Fig. 2, which are exactly like the 60 cycle curves $V^4$, $V^5$, and $C^3$, respectively.

The previously mentioned inductance Q which is connected in series with the winding of the electro-magnet $O^2$ of the vibrator O, lags 45 degrees with respect to the 60 cycle voltage oscillations in the supply system supplying energizing current to the electro-magnet $O^2$. This oscillation lag of the armature O' serves the purposes of the present invention by causing the 120 cycle component of the voltage induced in the secondary winding 69 of the transformer 51 to lag 45 degrees with respect to the 60 cycle supply system voltage represented by the curve $V'$ in Figs. 2, 3 and 4, and by producing a corresponding lag of the voltage induced in the secondary winding 70 of transformer 51, with respect to the last mentioned voltage. It is noted that while the 120 cycle component of the voltage induced in the secondary winding 52 of the transformer 51, will lag the supply voltage as does the 120 cycle voltage induced in coil winding 69, said component has no significant effect on the operation of the motor E since the energizing means of that motor is not significantly responsive to said 120 cycle current component.

The lag of the 120 cycle components of the voltages induced in the transformer secondary windings 69 and 70, is essential, however, to the intended operation of the motor I, as consideration of the current curves $C^{14}$ and $C^{15}$ and the voltage curves $V^{15}$ and $V^{16}$ of Fig. 3, and of the respectively analogous curves $C^{17}$ and $C^{18}$, $V^{18}$ and $V^{19}$ of Fig. 4, will make apparent.

The operative effect of the 120 cycle voltage component induced in the winding 69, is to make the potential of the grid 53' alternately positive and negative, relative to the potential of the cathode 61', with a cycle frequency of 120. This is illustrated in Fig. 3 by the voltage curve $V^{15}$ in conjunction with the horizontal line VC which, for the present purpose, may be assumed to represent the potential of the cathodes 61' and 62'. With the 120 cycle frequency potential fluctuations of the grid 53' lagging 45 degrees with respect to the supply system voltage fluctuations represented by the curve $V'$, the apparatus should be and is so arranged that the maximum positive potential of grid 53' will be attained substantially simultaneously with the maximum positive potential of the supply system, as is collectively illustrated in Fig. 3 by the grid and supply voltage curves $V^{15}$ and curve $V'$, respectively. The voltage of the grid 53', represented by the curve $V^{15}$, causes the plate current through the tube 56' during the first half of the supply voltage cycle, to vary as represented by the Fig. 3 curve $C^{14}$. In the second half cycle of the curve $V'$ voltage cycle during which the anode 66' of the tube 56' is positive relative to the cathode 62', the potential of the grid 54' varies as shown by the curve $V^{16}$ of Fig. 3. As will be recognized, the curves $V^{15}$ and $V^{16}$, shown in Fig. 3, are sections of cyclic curves which have the same frequency but which are 180 degrees out of phase with one another. This is necessarily incidental to the fact that with the transformer secondaries 69 and 70 arranged and connected as shown in Fig. 1, the fluctuating potential of the grid 53' is respectively positive and negative relative to the common potential of the cathodes 61' and 62', during the periods in which the potential of the grid 54' is respectively negative and positive relative to said common cathode potential.

The maximum negative value of the grid potential represented by the curve $V^{16}$, occurs at the instant at which the plate current through the tube 56' woud attain its maximum value if the potential of the grid 54' were continuously equal to the potential of the cathode 56'. The effect of the variations in the relative potential of the grid 54' and cathode 56', collectively illustrated by the curves $V^{16}$ and straight line VC of Fig. 3 is to substantially reduce the maximum and average values of the plate current through the tube 56', and to cause that plate current to vary as indicated by the curve $C^{15}$.

As will be readily understood, the passage of the plate currents represented by the curves $C^{14}$ and $C^{15}$ through the parallel resonant circuit formed by the control winding 57' and condenser 68' during successive half cycles, results in voltage and current conditions in the winding 57' which are represented by the sinusoidal curves $V^{17}$ and $C^{16}$, respectively, of Fig. 3. The 120 cycle potential fluctuations of the grids 53' and 54' thus produce the same sort of current flow variations in the control winding 57' of the motor I, as are produced in the control winding 57 of the motor E by the 60 cycle fluctuations in the common potential of the grids 53 and 54. In consequence. the effect of a decrease in the voltage of the thermocouple voltage C which produces a clockwise rotation of the rotor E', is to unbalance the bridge circuit of the control apparatus H in such manner as to produce a clockwise rotation of the rotor I', and an adjustment of the contact 25 to the left along the resistance 20, as is required to rebalance said bridge circuit.

In an analogous manner, the effect of a significant increase in the temperature of the thermocouple C and the resultant adjustment of the contact 23 to the right along the resistor 19. is to decrease the plate current through the tube 55' during the first half of the supply system 60 frequency cycle shown in Figs. 2, 3 and 4, and thus make the first half cycle 120 frequency grid voltage and current curves $V^{18}$ and $C^{17}$ of Fig. 4, similar in shape to the second half cycle voltage and current curves $V^{16}$ and $C^{15}$ of Fig. 3. Similarly. the second half cycle voltage and current curves $V^{19}$ and $C^{18}$ of Fig. 4, are similar in shape to the first half cycle voltage and current curves $V^{15}$ and $C^{14}$ of Fig. 3. The motor control winding voltage and current curves $V^{20}$ and $C^{19}$, respectively, are therefore similar in shape to the curves $V^{17}$ and $C^{16}$ of Fig. 3, but the voltage curve $V^{20}$ leads the current curve $C^{19}$ of Fig. 4 by approximately 90 degrees, and results, on the foregoing assumptions, in a rotation of the motor rotor I in the counter-clockwise direction as required to rebalance the control apparatus H by shifting the contact 25 to the right.

As will be apparent, the apparatus diagrammatically illustrated and described herein is characterized by its operative reliability and effectiveness and by its structural simplicity, and in particular by the manner in which control signals of different frequencies transmitted by a common amplifier, are utilized to selectively operate reversible motors, one in accordance with one, and another in accordance with another of the signals of different frequencies.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims, and that in some cases certain features of my invention may be used to advantage without a corresponding use of other features.

Having now described my invention what I claim as new, and desire to secure by Letters Patent, is:

1. Measuring and control apparatus comprising in combination, a potentiometric network, a proportioning control bridge circuit, means responsive to the value of a measurable quantity for unbalancing said potentiometric network on a change in said quantity, a reversible motor for rebalancing said potentiometric network when the latter is unbalanced and for simultaneously unbalancing said bridge circuit, a second reversible motor for rebalancing said control bridge circuit when the latter is unbalanced and for effecting a proportional control action, an electronic amplifier having an input circuit and an output circuit, means connected to said input circuit and operating on a change in said quantity to create an alternating current flow in said output circuit which is of one frequency and is selectively dependent in phase on the direction of said change, means connected to said input circuit and operating in response to unbalance in said bridge circuit to create an alternating current flow in said output circuit which is of a second frequency different from the first mentioned frequency and which is selectively dependent in phase upon the direction of unbalance of said bridge circuit, the first mentioned motor comprising energizing means including a control winding connected to said output circuit and actuated by alternating current flow therein of the first mentioned frequency to effect operation of said motor in a direction selectively dependent on the phase of said current flow, and the second mentioned motor comprising energizing means including a control winding connected to said output circuit and actuated by alternating current flow in said output circuit of said second frequency to effect operation of said second motor in a direction selectively dependent on the phase of the last mentioned current flow.

2. Apparatus of the character specified comprising in combination an electronic amplifier having an input circuit and an output circuit, means connected to said input circuit and operating on a change in one controlling condition to create an alternating current flow in said output circuit which is of one frequency and is selectively dependent in phase on the direction of said change, means connected to said input circuit and operating on a change in a second controlling condition to create an alternating current flow in said output circuit which is of a second frequency different from the first mentioned frequency and which is selectively dependent in phase upon the direction of the last mentioned change, a reversible motor including a power winding adapted to be connected to a source of alternating current of the first mentioned frequency and including a control winding connected to said output circuit and actuated by alternating current flow therein of the first mentioned frequency to effect operation of said motor in a direction selectively dependent on the phase of said current flow, and a second motor including a power winding adapted to be connected to a source of alternating current of the first mentioned frequency and including a control winding connected to said output circuit and actuated by alternating current flow in said output circuit of said second frequency to effect operation of said second motor in a direction selectively dependent on the phase of the last mentioned current flow.

3. Apparatus as specified in claim 2, in which the means creating the two output circuit current flows operate to make the frequency of one of said current flows double that of the other current flow.

4. Apparatus of the character specified comprising in combination a source of alternating current, an electronic amplifier having an input circuit and an output circuit, means comprising an electro-magnetic circuit interrupter energized by said source and comprising a polarized, vibrating, circuit controlling, armature and operating on a change in one controlling condition to create an alternating current flow in said output circuit which is of one frequency, means including a second electro-magnetic circuit interruptor energized by said source and comprising an unpolarized, vibrating, circuit controlling, armature and operating on a change in a second controlling condition to create an alternating current flow in said output circuit which is of a second frequency double that of the first mentioned frequency, a reversible motor comprising energizing means including a control winding connected to said output circuit and actuated by alternating current flow therein of the first mentioned frequency to effect operation of said motor and a second reversible motor comprising energizing means including a control winding connected to said output circuit and actuated by alternating current flow in said output circuit of said second frequency to effect operation of said second motor.

5. Apparatus of the character specified comprising in combination, a control circuit, means for impressing an alternating voltage of one frequency on said circuit, means for impressing on said circuit a second alternating voltage of a frequency different from the first mentioned frequency, an alternating current motor including a power winding adapted to be connected to a source of alternating current of the first mentioned frequency, and including a control winding connected to said control circuit and cooperating with said power winding to effect operation of said motor when the first mentioned voltage is being impressed on said input circuit, a second alternating current motor including a power winding adapted to be connected to a source of alternating current of the first mentioned frequency, and including a control winding connected to said control circuit and cooperating with the last mentioned power winding to effect operation of said second motor when current of said second frequency is impressed on said circuit.

6. Apparatus as specified in claim 5, comprising means connecting the control winding of said second motor to said output circuit and including frequency converting means through which current flow in said output circuit of said second frequency creates current flow of said one frequency in said second motor control winding.

7. The combination with two alternating current motors each having energizing means including a power winding and a control winding of means supplying alternating current of the same frequency to the power windings of the two motors, an electronic amplifier having input and output circuits, means for intermittently impressing an alternating voltage of said frequency on said input circuit, means for intermittently impressing an alternating voltage of a second frequency on said input circuit, means connecting the control winding of one motor to the output circuit of the amplifier and operative to maintain an alternating current flow of the first mentioned frequency through the last mentioned winding when alternating voltage of that frequency is impressed on said input circuit and thereby effect operation of said motor and means connecting the control winding of the second motor to said output circuit and operative to maintain an alternating current flow of the first mentioned frequency through the last mentioned winding and thereby effect operation of said other motor when alternating potential of said second frequency is impressed on said input circuit.

8. A reversible alternating current motor comprising a control winding and a power winding and running in one direction or the other when alternating current flow in one of said windings respectively lags or leads alternating current flow of the same frequency in the other winding, said power winding having a pair of terminals adapted to be connected to a source of alternating current of predetermined frequency, two electronic valves each comprising an anode, a cathode and a control electrode and having an anode circuit including said control winding, means for impressing on said anode circuits alternating voltages which are of said predetermined frequency and are 180 degrees out of phase with one another and one of which is substantially in phase with the current flow in said power winding, and means for impressing alternating voltages on the two control electrodes which are 180 degrees out of phase with one another and are of a frequency double said predetermined frequency, and which are in such phase relation with the first mentioned voltages to either increase or decrease the current in one and to respectively decrease or increase the current in the other of said anode circuits and to thereby respectively cause said motor to turn in one direction or the other.

9. A reversible alternating current motor comprising a control winding and a power winding and adapted to run in one direction or the other accordingly as alternating current flow in one of said windings lags or leads alternating current flow of the same frequency in the other winding, said power winding having a pair of terminals adapted to be connected to a source of alternating current of predetermined frequency, a capacitance, two electronic valves each comprising an anode, a cathode and a control electrode and having an anode circuit including said capacitance and said control winding connected in parallel, means for impressing on said anode circuits alternating voltages which are of said predetermined frequency and which are 180 degrees out of phase with one another and one of which is substantially in phase with the current flow in said power winding, and means for impressing alternating voltages on the two control electrodes which are of a frequency double said predetermined frequency and which are 180 degrees out of phase with one another and one of which is displaced approximately 45 degrees in phase with respect to one of the first mentioned voltages at recurring cyclic moments at which the value of the last mentioned voltage is zero.

WALTER P. WILLS.